J. ANDREWS.
Grain-Drill.
No. 24,979. Patented Aug. 9, 1859.
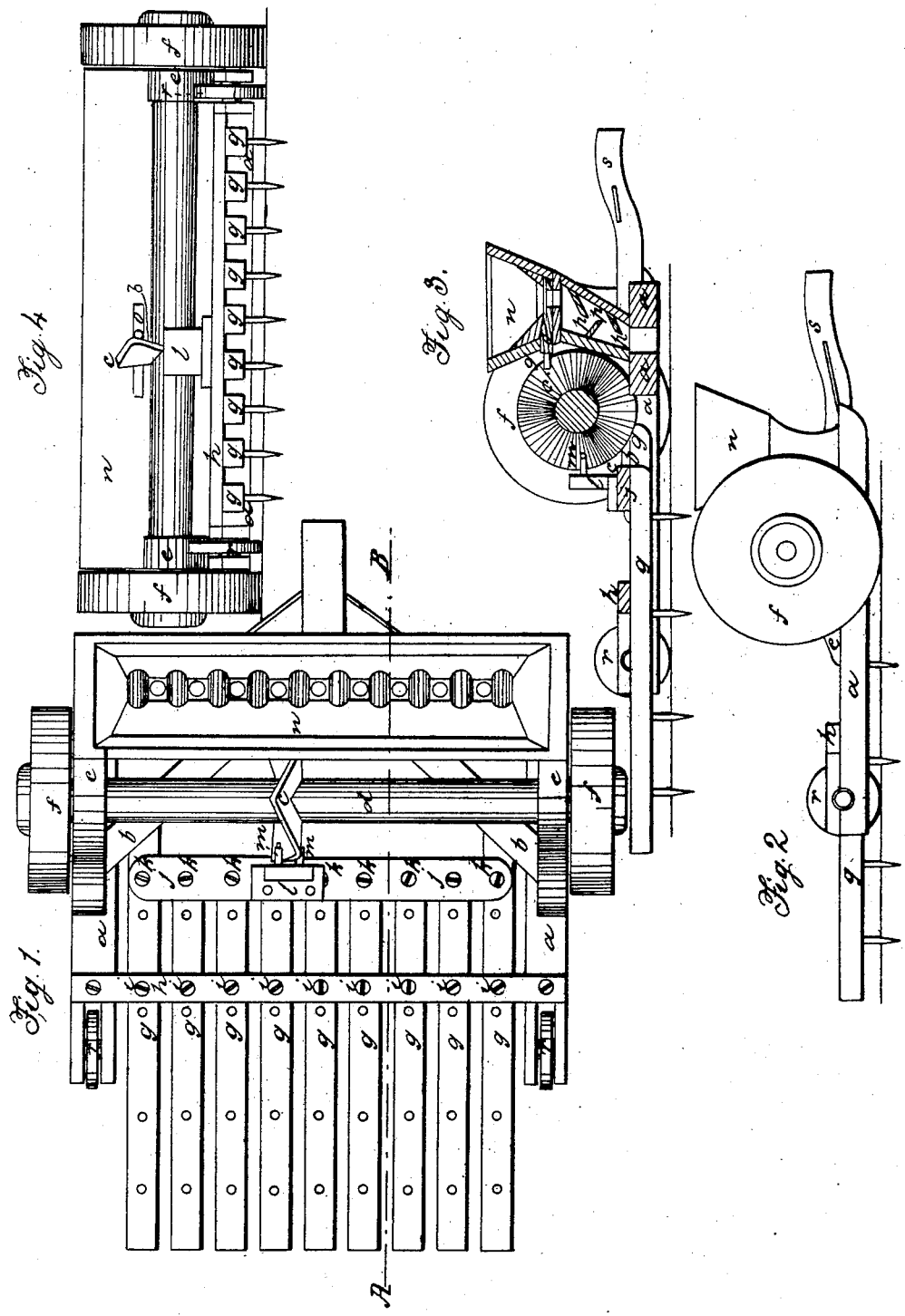

UNITED STATES PATENT OFFICE.

JOHN ANDREWS, OF CLINTON, MASSACHUSETTS.

IMPROVEMENT IN SEEDING-MACHINES.

Specification forming part of Letters Patent No. 24,979, dated August 9, 1859.

*To all whom it may concern:*

Be it known that I, JOHN ANDREWS, of Clinton, in the county of Worcester and State of Massachusetts, have invented new and useful Improvements in a Vibrating Harrow and Grain-Sower Combined; and I do hereby declare that the following is a full, clear, and exact description thereof, reference being had to the accompanying drawings, making a part of this specification, in which—

Figure 1 represents a top view of my improved vibrating harrow and grain-sower combined. Fig. 2 represents a side view of the same. Fig. 3 represents a longitudinal vertical section taken on the red line A B, and Fig. 4 a rear end view.

The same letters indicate like parts in all the figures.

I will now proceed to describe its construction and operation.

$a\ a$ represent the side or bed pieces of the harrow and the cross-pieces on the front of the harrow.

$b\ b$ represent braces. $c$ represents a bent angular cam, and is placed on and near the center of the axle $d$. The axle $d$ rests on bearings in the stands $e\ e$ on the side or bed pieces $a\ a$.

$f f$ represent wheels placed at each end of the axle $d$ and outside of the cross or bed pieces $a\ a$. These wheels have large flat surfaces on their outer circumference to prevent their sinking into the ground. One of them is made fast, and revolves with the axle $d$ in order to enable turning the machine more easily and readily.

$g\ g\ g\ g$ represent longitudinal blocks of timber or joist, in which are placed harrow-teeth of the usual form. The blocks $g\ g\ g$ are placed a short distance apart, parallel with each other, and between the side or bed pieces $a\ a$.

$h$ represents a cross-bar placed near the rear end of the side or bed pieces $a\ a$, extending from one to the other, and fastened thereto.

$i\ i\ i$ represent rods or bolts with large heads. These rods or bolts are made to pass down through the cross-bar $h$, through holes in the blocks $g\ g\ g$, and secured by means of a nut on the bottom.

$j$ represents a bar placed on and near the front end of the blocks $g\ g\ g$.

$k\ k\ k$ represent rods or bolts having large heads. These are also passed down through the bar $j$ and through holes in the blocks $g\ g\ g$.

$l$ represents a stand, from which project the guides $m\ m$. The outer edge of the cam $c$ passes down between the guides $m\ m$. When the machine is put in motion and the axle $d$ caused to revolve, then the outer edge of the cam $c$ in its revolution is brought into contact with one of the guides $m$ and pushes the end of the blocks $g\ g\ g$ to one side. Then when the reverse bent part of the cam $c$ is brought to bear upon the other guide $m$ the end of the blocks $g\ g\ g$ are moved in an opposite direction, thereby giving to the harrow-teeth a zigzag motion and producing the result before mentioned.

$n$ represents a hopper, made wider at the top than at the bottom, placed on the front and extending the whole width of the harrow. This has divisions or partitions made to conduct the seed toward the holes in the bottom thereof.

$o$ represents a slide placed underneath the the hopper $n$ and extending the whole length thereof. The slide $n$ is provided with cups and followers for receiving the seed and regulating the quantity to be sown.

$p\ p\ p$ represent boards placed underneath the hopper, and in opposite angular directions, for spreading and scattering the seed as it falls to the ground.

$q\ q$ represent guides on the slide $n$ and in which works one edge of the cam $c$, when the shaft or axle $d$ is made to turn, causing the cam $c$ to revolve and bringing the edge to act upon one of the guides $q$, and pushing the slide $n$ one side in such a manner that the cups are brought directly underneath the holes, where they are filled with seed. Then when the reverse bent part of the cam $c$ is made to act the slide $n$ is carried in an opposite direction. The cups being then emptied of their contents, the seed falls upon the boards $p\ p\ p$, and is conveyed to the ground in an even and thorough manner.

$r\ r$ represent wheels placed in the rear end of the side or bed pieces $a\ a$ for the purpose of keeping the harrow at an even height above the ground. The depth at which the ground is required to be stirred may be regulated by the raising and lowering of the harrow-teeth.

$s$ represents the shaft or pole to which the team is attached.

The harrow may be used in connection with the grain-sower or not, as may be desired.

Having described the several parts of my invention and pointed out some of the advantages to be derived therefrom, what I claim as new, and desire to secure by Letters Patent, is—

The arrangement and combination of the vibrating bars or blocks $g$, frame $a$, axle $d$, cam $c$, and seed-slide $n$, as set forth, whereby the cam which operates the harrow also moves the seed-slide, and the harrow-bars $g$ have a horizontal vibration and also a vertical play with the frame upon the axle $d$.

Clinton, January 24, 1859.

JOHN ANDREWS.

Witnesses:
  JOSHUA THISSELL, Jr.,
  OTIS B. BATES.